United States Patent
Paddon et al.

(10) Patent No.: US 8,433,843 B2
(45) Date of Patent: Apr. 30, 2013

(54) METHOD FOR PROTECTING SENSITIVE DATA ON A STORAGE DEVICE HAVING WEAR LEVELING

(75) Inventors: Michael W. Paddon, Tokyo-to (JP); Craig M. Brown, Harbord (AU); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 12/415,865

(22) Filed: Mar. 31, 2009

(65) Prior Publication Data
US 2010/0250835 A1 Sep. 30, 2010

(51) Int. Cl.
*G06F 13/00* (2006.01)
(52) U.S. Cl.
USPC ........... 711/103; 711/102; 711/112; 711/135; 711/155; 365/230.02
(58) Field of Classification Search .......... 711/102–103, 711/112, 114, 135, 155, E12.001, E12.008; 365/230.02, 230.03
See application file for complete search history.

(56) References Cited

U.S. PATENT DOCUMENTS

| | | | |
|---|---|---|---|
| 5,341,339 | A | 8/1994 | Wells |
| 6,850,443 | B2 | 2/2005 | Lofgren et al. |
| 2002/0184432 | A1 | 12/2002 | Ban |
| 2003/0005323 | A1 | 1/2003 | Hanley et al. |
| 2009/0006787 | A1* | 1/2009 | De Souza et al. ............. 711/156 |

FOREIGN PATENT DOCUMENTS

| | | |
|---|---|---|
| WO | WO03079196 | 9/2003 |
| WO | WO2004040578 | 5/2004 |
| WO | WO 2004040578 A2 * | 5/2004 |

OTHER PUBLICATIONS

Information Technology Small Computer System Interface Part 321: SCSI-3 Block Commands (SBC), Sep. 30, 1999, XP007914151.*
Agam Shah, "SSDs are hot, but not without security risks", InfoWorld, Aug. 22, 2008, http://www.infoworld.com/article/08/08/22/SSDs_are_hot_but_not_without_security_risks_2.html.
Pat Wilkison, "Protecting Military Data in a Flash", COTS Jornal, Jun. 2005 http://www.slec-inc.com/downloads/COTS_Journal.pdf.
Information technology Small Computer System Interface Part 321: SCSI-3 Block Commands (SBC) Technologies de l'information Interface de petit ordinateur Partie 321: Commandes du bloc SCSI-3 (SBC) Draft International Standard ISO/IEC DIS, XX, XX, [Online] Jan. 1, 1999, p. Complete, XP007914151.
International Search Report and Written Opinion—PCT/US2010/029354, International Search Authority—European Patent Office—Aug. 6, 2006.
"INCITS 397-2005 (1532D): AT Attachment with Packet Interface". SSA SCSI-3 Protocol (SSS-S3P) INCITS 309-1997.

* cited by examiner

*Primary Examiner* — Tuan Thai
*Assistant Examiner* — Zhuo Li
(74) *Attorney, Agent, or Firm* — Won Tae Kim

(57) ABSTRACT

Disclosed is a method for protecting sensitive data in a storage device having wear leveling. In the method, a write command, with an associated sensitive write signal indicating that sensitive data is associated with the write command, is received. The sensitive data is further associated with at least one address pointing to a storage location within an initial physical storage block. The write command is executed by writing to at least one storage location within an available physical storage block, pointing the at least one address to the at least one storage location within the available physical storage block, and erasing the initial physical storage block to complete execution of the write command.

30 Claims, 4 Drawing Sheets

METHOD FOR PROTECTING SENSITIVE DATA ON A STORAGE DEVICE HAVING WEAR LEVELING

BACKGROUND

1. Field

The present invention relates generally to protecting sensitive data from undesired recovery in a storage device having wear leveling.

2. Background

Solid state storage devices using flash memory are becoming prevalent due to advantages in performance, robustness, and power consumption. Flash memory is susceptible to wear as a result of repeated write and erase operations that are inherent in particular data storage applications including hard disk drive replacement applications. Read operations do not cause significant wear.

A storage device having flash memory is often organized into physical storage blocks having hundreds or thousands of addressable storage locations. A typical workload in a disk drive replacement application may be markedly asymmetric, meaning that some addresses are written to much more often than others. A technique of "wear leveling" is generally applied to prevent any particular storage block from reaching its maximum number of erase cycles significantly before other storage blocks, and thus prematurely limiting the longevity of the storage device. An entire physical storage block is erased in a "flash" operation. Thus, to overwrite data in a physical storage block, the entire block must first be erased with a flash operation before the new data is written to the storage locations.

Wear leveling may use a different underlying physical storage block, at different times, to represent a particular logical address. Thus, an operation to overwrite an initial value in a particular storage location of an initial physical storage block may result in the new value being written to a storage location of a different available physical storage block. Although an address pointer would now point to the new storage location with the new value, the initial value may remain in the storage location of the initial physical storage block until sufficient storage locations are "overwritten" to cause a cleanup operation that moves any remaining valid data to storage locations in an available physical block and flash erases the initial physical storage block. In the meantime, an attacker may recover the initial value before the cleanup operation.

Worse still, when a physical storage block approaches failure, it is taken out of service by the wear leveling algorithm. The sidelined physical storage location may never be erased and thus may retain its contents for the life of the storage device.

There is therefore a need for a technique that protects sensitive data from recovery in a storage device having wear leveling.

SUMMARY

An aspect of the invention may reside in a method for protecting sensitive data in a storage device having wear leveling. In the method, a write command, with an associated sensitive write signal indicating that sensitive data is associated with the write command, is received. The sensitive data is further associated with at least one address pointing to a storage location within an initial physical storage block. The write command is executed by writing to at least one storage location within an available physical storage block, pointing the at least one address to the at least one storage location within the available physical storage block, and erasing the initial physical storage block to complete execution of the write command.

In more detailed aspects of the invention, the storage device may be a flash memory solid-state device. The sensitive write signal may comprise an electrical signal on a hardware interface of the storage device. Alternatively, the write command may comprise the sensitive write signal, or the sensitive write signal may comprise an erase-by-pass bit of a SCSI write (10) command. Further, a distinct pattern in data being written by the write command may comprise the sensitive write signal. The sensitive write signal may include a data sensitivity level for indicating an erasure technique for erasing the initial physical storage block. A high data sensitivity level may cause multiple erasure pattern write and block erase operations for erasing the initial physical storage block.

In other more detailed aspect of the invention, executing the write command may further include transferring data stored in the initial physical storage block, at locations not associated with an address associated with the write command, to an available physical storage block before erasing the initial physical storage block to complete execution of the write command. Also, the initial physical storage block may comprise a plurality of storage locations each associated with a corresponding address.

Another aspect of the invention may reside in an apparatus having wear leveling and sensitive data protection. The apparatus may include means for receiving a write command with an associated sensitive write signal indicating that sensitive data is associated with the write command. The sensitive data may be further associated with at least one address pointing to a storage location within an initial physical storage block. The apparatus may further include means for executing the write command including means for writing to at least one storage location within an available physical storage block, means for pointing the at least one address to the at least one storage location within the available physical storage block, and means for erasing the initial physical storage block to complete execution of the write command.

Another aspect of the invention may reside in a computer program product, comprising computer readable medium, comprising code for causing a computer to receive a write command with an associated sensitive write signal indicating that sensitive data is associated with the write command, wherein the sensitive data is further associated with at least one address pointing to a storage location within an initial physical storage block, and code for causing a computer to execute the write command by writing to at least one storage location within an available physical storage block, pointing the at least one address to the at least one storage location within the available physical storage block, and erasing the initial physical storage block to complete execution of the write command.

Another aspect of the invention may reside in an apparatus, having wear leveling and sensitive data protection, comprising a processor and a memory coupled to the processor for storing data. The processor is configured to receive a write command with an associated sensitive write signal indicating that sensitive data is associated with the write command, wherein the sensitive data is further associated with at least one address pointing to a storage location within an initial physical storage block, and configured to execute the write command by writing to at least one storage location within an available physical storage block, pointing the at least one address to the at least one storage location within the available physical storage block, and erasing the initial physical storage block to complete execution of the write command.

DETAILED DESCRIPTION

The word "exemplary" is used herein to mean "serving as an example, instance, or illustration." Any embodiment described herein as "exemplary" is not necessarily to be construed as preferred or advantageous over other embodiments.

With reference to FIGS. 1-5, an aspect of the invention may reside in a method 200 for protecting sensitive data in a storage device 100 having wear leveling. In the method, a write command CMD, with an associated sensitive write signal indicating that sensitive data IV2 is associated with the write command, is received (step 210). The sensitive data is further associated with at least one address A2 pointing to a storage location SL2 within an initial physical storage block B1. The write command is executed (step 220) by writing to at least one storage location SL1 within an available physical storage block B2 (step 230), pointing the at least one address A1 to the at least one storage location SL1 within the available physical storage block B2 (step 240), and erasing the initial physical storage block B1 to complete execution of the write command (step 250).

Figure 3:
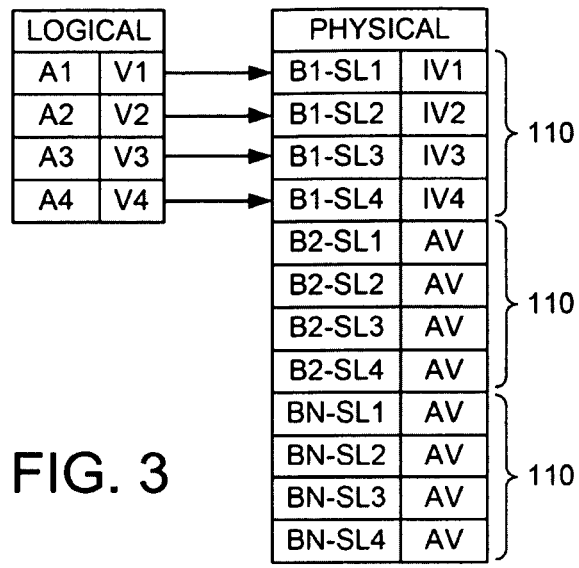
FIG. 3 is a schematic block diagram illustrating logical addresses pointing to storage locations of physical storage blocks before a write operation associated with sensitive data.
Figure 4:
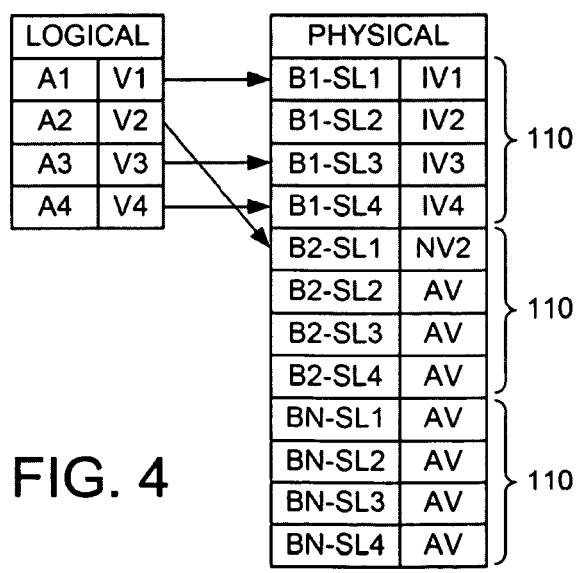
FIG. 4 is a schematic block diagram illustrating logical addresses pointing to storage locations of physical storage blocks during a write operation associated with sensitive data.
Figure 5:
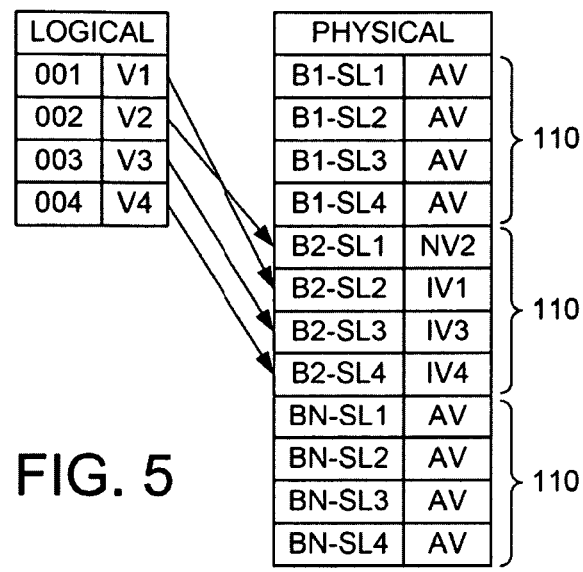
FIG. 5 is a schematic block diagram illustrating logical addresses pointing to storage locations of physical storage blocks after a write operation associated with sensitive data.

The storage device 100 may be a flash memory solid state device having a plurality of physical storage blocks 110, designated B1 through BN. The initial physical storage block B1 may have a plurality of storage locations, SL1-SL4, each associated with a corresponding address, A1-A4. For purposes of explanation, only four addresses and storage locations are shown. An actual physical storage block may have hundreds or thousands of addressable storage locations. Further each address, A1-A4, is associated with a value, V1-V4. In the context of a write operation, a storage location may store an initial value IV before a write operation, and a new value NV after a write operation. An available storage location is indicated by AV. FIG. 3 shows the address pointers before the write operation. The pointer for address A2 points to the second storage location SL2 of the initial physical storage block B1. FIG. 4 shows the address pointers during the write operation, after step 240. The pointer for address A2 points to the first storage location SL1 of the second physical storage block B2. Note that an actual write operation may write to a number of addresses, in which case, a corresponding number of address pointers will be directed to the storage locations having the new values. Flash erasing the first physical storage block B1 at this time in the write operation may erase valid data stored for addresses A1, A3 and A4. Thus, executing the write command CMD may further include transferring data, IV1, IV3 and IV4, stored in the initial physical storage block B1, at locations, SL1, SL3 and SL4, not associated with the address A2 associated with the write command CMD, to an available physical storage block B2 before erasing the initial physical storage block B1 to complete execution of the write command.

The operating system of a host 125 can see the logical addresses only. The operation system is not privy to the storage device's internal mapping between the logical addresses and the storage locations SL of the storage blocks BN. Thus, wear leveling, an operation internal to the storage device, dynamically maps logical addresses to storage locations to ensure that one physical block is not worn out prematurely when a particular logical address is constantly written to.

The sensitive write signal may comprise an electrical signal on a hardware interface 120 of the storage device with a host 125. Alternatively, the write command may comprise the sensitive write signal. This sensitive write command may be a standardized for effecting the protection of sensitive data. Also, the sensitive write signal may be an erase-by-pass bit of an existing SCSI write (10) command, applied to flash memory storage devices. Another alternative is to use a currently reserved bit of an existing command.

Figure 6:
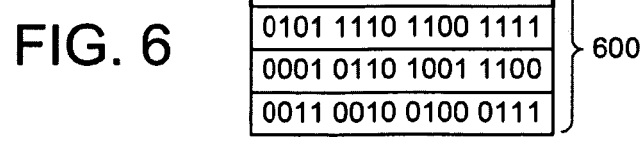
FIG. 6 is a schematic block diagram of write data that includes a distinct pattern comprising a sensitive write signal.

With reference to FIG. 6, a distinct pattern 610 in data being written by the write command may comprise the sensitive write signal. In this case, the sensitive write signal is implicit. The distinct pattern may be a pattern of all zero's for a certain number of bits or bytes at the beginning of the end of the data field 600. Also, the distinct pattern may be a statistically unlikely data pattern. This distinct pattern embodiment may permit implementation of the invention over existing hardware and program interfaces.

The sensitive write signal may include a data sensitivity level for indicating an erasure technique for erasing the initial physical storage block B1. A high data sensitivity level may cause multiple erasure pattern write and block erase operations for erasing the initial physical storage block. A low data sensitivity may cause merely one block erase operation.

A particular distinct pattern may encode the data sensitivity level. An implementation may provide a mechanism to add or delete predefined distinct patterns from an internal list on the storage device 100. Each such distinct pattern may be associated with a sensitivity level which selects varying levels of treatment of the storage block 110 to be erased. In such cases, the storage device recognizes the particular pattern in the write data and applies the enhanced erasure mechanisms to the affected physical storage block, as indicated. An advantage of this mechanism is that even programs without knowledge of the underlying flash memory storage mechanisms may securely erase data.

The sensitive write signal represents that the write operation associated with the write command is sensitive. Typically, the write command so marked is intended to erase sensitive data that was previously written to the device. An example would be a desire to write zeros over previously stored cryptographic keys, which may not be effective with wear leveling in operation. The newly written data may or may not be sensitive. For example, in the case of an implicit sensitive write signal, the data being written by the write command need not be sensitive.

Another aspect of the invention may reside in an apparatus 100 having wear leveling and sensitive data protection. The apparatus may include means 130 for receiving a write command CMD with an associated sensitive write signal indicating that sensitive data NV2 is associated with the write command. The sensitive data may be further associated with at least one address A2 pointing to a storage location SL2 within an initial physical storage block B1. The apparatus may further include means 130 for executing the write command including means 130 for writing to at least one storage location SL1 within an available physical storage block B2, means 130 for pointing the at least one address A2 to the at least one storage location SL1 within the available physical storage block B2, and means 130 for erasing the initial physical storage block B1 to complete execution of the write command.

Another aspect of the invention may reside in a computer program product, comprising computer readable medium 140, comprising code for causing a computer or processor 150 to receive a write command CMD with an associated sensitive write signal indicating that sensitive data NV2 is associated with the write command, wherein the sensitive data is further associated with at least one address A2 pointing to a storage location SL2 within an initial physical storage block B1, and code for causing a computer to execute the write command by writing to at least one storage location SL1 within an available physical storage block B2, pointing the at least one address A1 to the at least one storage location SL1 within the available physical storage location B2, and erasing the initial physical storage block B1 to complete execution of the write command.

Another aspect of the invention may reside in an apparatus, having wear leveling and sensitive data protection, comprising a processor 150 and a memory 140 coupled to the processor for storing data. The processor is configured to receive a write command CMD with an associated sensitive write signal indicating that sensitive data NV2 is associated with the write command, wherein the sensitive data is further associated with at least one address A2 pointing to a storage location SL2 within an initial physical storage block B1, and configured to execute the write command by writing to at least one storage location SL1 within an available physical storage block B2, pointing the at least one address A1 to the at least one storage location SL1 within the available physical storage block B2, and erasing the initial physical storage block B1 to complete execution of the write command.

Figure 1:
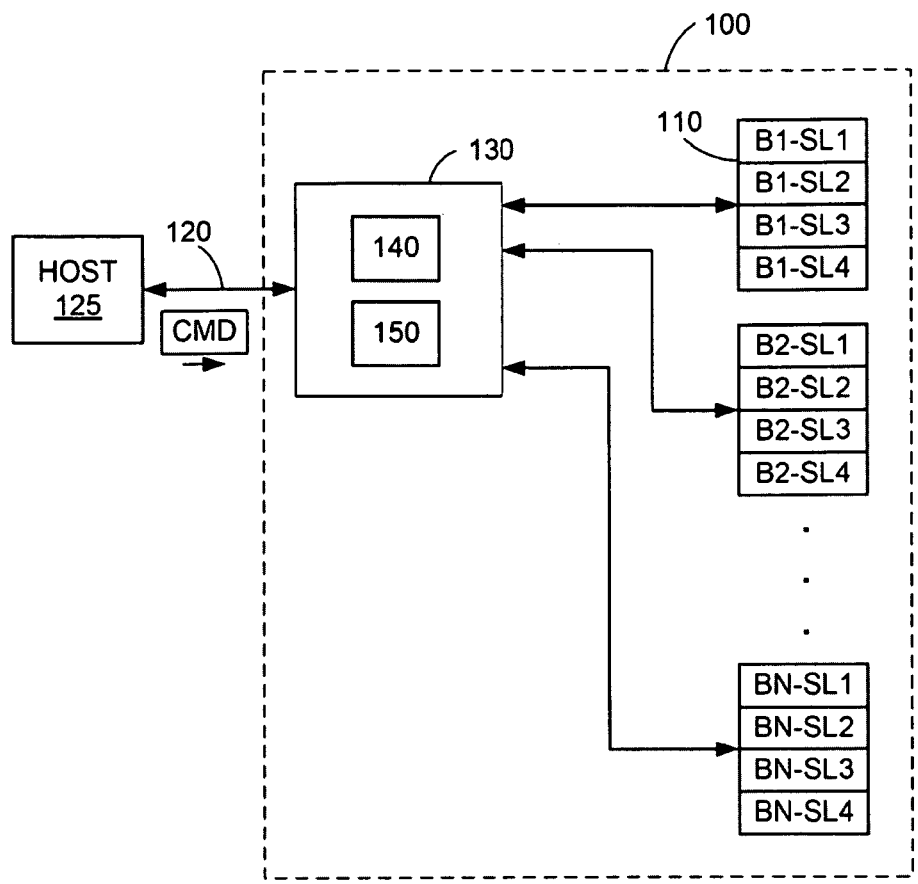
FIG. 1 is a schematic block diagram of a storage device having wear leveling and sensitive data protection, according to the present invention.
Figure 7:
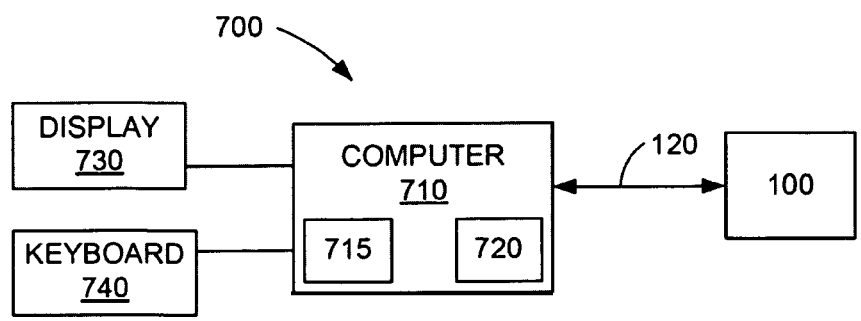
FIG. 7 is a block diagram of a computer using a storage device, having wear leveling, in a disk drive replacement application.
Figure 2:
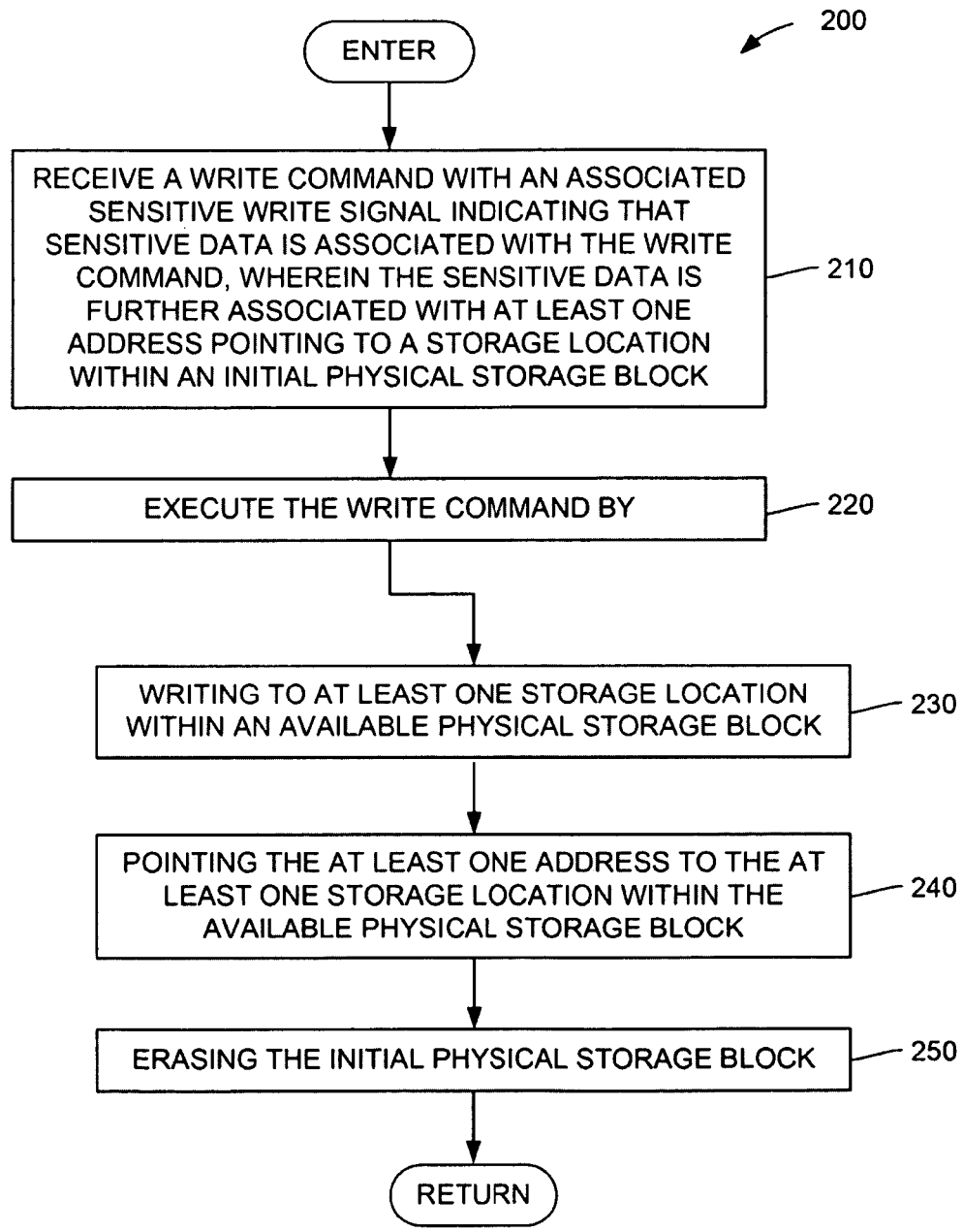
FIG. 2 is a flow diagram of a method for protecting sensitive data in a storage device having wear leveling, according to the present invention.

With reference to FIG. 7, a user device 700 may use the storage device 100 in a disk drive replacement application. Similarly, the user device may be a mobile phone, PDA, or similar device using fixed or removable flash memory. The user device may include a computer 710 having a processor 715, a resident storage medium 720, a display 730, and an input device 740 such as a keyboard. The user device may be connected to the storage device 100 by the hardware interface 120.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for protecting sensitive data in a storage device having wear leveling, comprising:
    receiving a write command with an associated sensitive write signal indicating that sensitive data is associated with the write command, wherein the sensitive data is further associated with at least one address pointing to a storage location within an initial physical storage block, and wherein the sensitive write signal includes a data sensitivity level for indicating an erasure technique for erasing the initial physical storage block; and
    executing the write command by:
        writing to at least one storage location within an available physical storage block,
        pointing the at least one address to the at least one storage location within the available physical storage block, and
        erasing the initial physical storage block to complete execution of the write command.

2. A method for protecting sensitive data as defined in claim 1, wherein the storage device is a flash memory solid-state device.

3. A method for protecting sensitive data as defined in claim 1, wherein the sensitive write signal comprises an electrical signal on a hardware interface of the storage device.

4. A method for protecting sensitive data as defined in claim 1, wherein the write command comprises the sensitive write signal.

5. A method for protecting sensitive data as defined in claim 1, wherein the sensitive write signal comprises an erase-by-pass bit of a SCSI write (10) command.

6. A method for protecting sensitive data as defined in claim 1, wherein a distinct pattern in data being written by the write command comprises the sensitive write signal.

7. A method for protecting sensitive data as defined in claim 1, wherein a high data sensitivity level causes multiple erasure pattern write and block erase operations for erasing the initial physical storage block.

8. A method protecting sensitive data as defined in claim 1, wherein executing the write command further includes transferring data stored in the initial physical storage block, at locations not associated with an address associated with the write command, to an available physical storage block before erasing the initial physical storage block to complete execution of the write command.

9. A method for protecting sensitive data as defined in claim 1, wherein the initial physical storage block comprises a plurality of storage locations each associated with a corresponding address.

10. An apparatus having wear leveling and sensitive data protection, comprising:
    means for receiving a write command with an associated sensitive write signal indicating that sensitive data is associated with the write command, wherein the sensitive data is further associated with at least one address pointing to a storage location within an initial physical storage block, and wherein the sensitive write signal includes a data sensitivity level for indicating an erasure technique for erasing the initial physical storage block; and
    means for executing the write command including:
        means for writing to at least one storage location within an available physical storage block,
        means for pointing the at least one address to the at least one storage location within the available physical storage block, and
        means for erasing the initial physical storage block to complete execution of the write command.

11. An apparatus as defined in claim 10, wherein the sensitive write signal comprises an electrical signal on a hardware interface of the storage device.

12. An apparatus as defined in claim 10, wherein the write command comprises the sensitive write signal.

13. An apparatus as defined in claim 10, wherein the sensitive write signal comprises an erase-by-pass bit of a SCSI write (10) command.

14. An apparatus as defined in claim 10, a distinct pattern in data being written by the write command comprises the sensitive write signal.

15. An apparatus as defined in claim 10, wherein a high data sensitivity level causes means for erasing to perform multiple erasure pattern write and block erase operations.

16. An apparatus as defined in claim 10, wherein the means for executing the write command further includes means for transferring data stored in the initial physical storage block, at locations not associated with an address associated with the write command, to an available physical storage block.

17. An apparatus as defined in claim 10, wherein the initial physical storage block comprises a plurality of storage locations each associated with a corresponding address.

18. A computer program product, comprising:
    non-transitory computer readable medium, comprising:
        code for causing a computer to receive a write command with an associated sensitive write signal indicating that sensitive data is associated with the write command, wherein the sensitive data is further associated with at least one address pointing to a storage location within an initial physical storage block, and wherein the sensitive write signal includes a data sensitivity level for indicating an erasure technique for erasing the initial physical storage block;
        code for causing a computer to execute the write command by:
            writing to at least one storage location within an available physical storage block,
            pointing the at least one address to the at least one storage location within the available physical storage block, and
            erasing the initial physical storage block to complete execution of the write command.

19. A computer program product as defined in claim 18, wherein the write command comprises the sensitive write signal.

20. A computer program product as defined in claim 18, wherein the sensitive write signal comprises an erase-by-pass bit of a SCSI write (10) command.

21. A computer program product as defined in claim 18, wherein a distinct pattern in data being written by the write command comprises the sensitive write signal.

22. A computer program product as defined in claim 18, wherein the initial physical storage block comprises a plurality of storage locations each associated with a corresponding address.

23. An apparatus having wear leveling and sensitive data protection, comprising:
    a processor, configured to:
        receive a write command with an associated sensitive write signal indicating that sensitive data is associated with the write command, wherein the sensitive data is further associated with at least one address pointing to a storage location within an initial physical storage block, and wherein the sensitive write signal includes a data sensitivity level for indicating an erasure technique for erasing the initial physical storage block; and execute the write command by:
    writing to at least one storage location within an available physical storage block,
    pointing the at least one address to the at least one storage location within the available physical storage block, and
    erasing the initial physical storage block to complete execution of the write command; and a memory coupled to the processor for storing data.

24. An apparatus as defined in claim 23, wherein the sensitive write signal comprises an electrical signal on a hardware interface of the storage device.

25. An apparatus as defined in claim 23, wherein the write command comprises the sensitive write signal.

26. An apparatus as defined in claim 23, wherein the sensitive write signal comprises an erase-by-pass bit of a SCSI write (10) command.

27. An apparatus as defined in claim 23, a distinct pattern in data being written by the write command comprises the sensitive write signal.

28. An apparatus as defined in claim 23, wherein a high data sensitivity level causes means for erasing to perform multiple erasure pattern write and block erase operations.

29. An apparatus as defined in claim 23, wherein to execute the write command further includes transferring data stored in the initial physical storage block, at locations not associated with an address associated with the write command, to an available physical storage block.

30. An apparatus as defined in claim 23, wherein the initial physical storage block comprises a plurality of storage locations each associated with a corresponding address.

* * * * *